United States Patent [19]

Imaizumi

[11] Patent Number: 4,953,671

[45] Date of Patent: Sep. 4, 1990

[54] DAMPING FORCE ADJUSTABLE HYDRAULIC SHOCK ABSORBER

[75] Inventor: Tomio Imaizumi, Kanagawa, Japan

[73] Assignee: Tokico Ltd., Kanagawa, Japan

[21] Appl. No.: 392,270

[22] Filed: Aug. 10, 1989

[30] Foreign Application Priority Data

Aug. 12, 1988 [JP] Japan ............................. 63-201313

[51] Int. Cl.⁵ ................................................ F10F 9/44
[52] U.S. Cl. ..................................... 188/299; 188/282;
188/285; 188/319; 188/322.15
[58] Field of Search ............... 188/299, 280, 282, 285,
188/288, 322.15, 319

[56] References Cited

U.S. PATENT DOCUMENTS

| | | | |
|---|---|---|---|
| 4,646,883 | 3/1987 | Tanaka | 188/282 |
| 4,653,617 | 3/1987 | Casimir et al. | 188/322.15 |
| 4,660,689 | 4/1987 | Hayashi et al. | 188/319 |

FOREIGN PATENT DOCUMENTS

| | | |
|---|---|---|
| 17-17787 | 9/1942 | Japan . |
| 59-11932 | 1/1984 | Japan . |
| 61-1729 | 1/1986 | Japan . |
| 1004233 | 9/1965 | United Kingdom . |
| 1128249 | 9/1968 | United Kingdom . |
| 1476353 | 6/1977 | United Kingdom . |
| 2170572 | 8/1986 | United Kingdom . |

*Primary Examiner*—Andres Kashnikow
*Assistant Examiner*—Matthew C. Graham
*Attorney, Agent, or Firm*—Wenderoth, Lind & Ponack

[57] ABSTRACT

A hydraulic shock absorber is used, for example, in a vehicle, wherein the level of damping force is adjustable in accordance with the road surface conditions or the like during operation of the vehicle. The hydraulic shock absorber includes a piston attached to one end of a piston rod and slidably fitted in a cylinder, the piston dividing the interior of the cylinder into two cylinder chambers. A passage is provided in the piston, the passage communicating with each of the two cylinder chambers. A damping force generating valve is provided at the downstream side of the passage to generate damping force. A back-pressure chamber is formed at the side of the damping force generating valve which is remote from the piston to apply pressure to the valve. A bypass passage is formed in the piston rod to provide communication between the back-pressure chamber and the upstream cylinder chamber that is provided at the upstream side of the passage. A shutter is externally operable to control the condition of communication between the upstream cylinder chamber and the back-pressure chamber, thereby adjusting the level of pressure inside the back-pressure chamber. Thus, it is possible to obtain a plurality of damping force characteristics with a single damping force generating valve provided for each of the extension and contraction strokes.

6 Claims, 5 Drawing Sheets

DAMPING FORCE ADJUSTABLE HYDRAULIC SHOCK ABSORBER

BACKGROUND OF THE INVENTION

1. Field of the Invention:

The present invention relates to a hydraulic shock absorber for use, for example, in a vehicle, wherein the level of the damping force is adjustable in accordance with the road surface conditions or the like during the operation of the vehicle.

2. Description of the Prior Art:

There have heretofore been proposed various kinds of hydraulic shock absorbers for use for example, in automobiles which are designed so that the level of the damping force can be properly adjusted so as to be suitable for the road surface conditions during the operation of the vehicle in order to improve the driveability and enable the driver to enjoy a comfortable ride.

One type of conventional damping force adjustable hydraulic shock absorber is arranged such that a bypass passage which provides communication between two cylinder chambers, defined in a cylinder by a piston, is formed in a piston rod and a plurality of orifices are provided in the intermediate portion of the bypass passage so as to be selectively opened and closed by a shutter which is externally operated, thereby enabling a change in the level of damping force generated by means of the orifices, that is, a change in the orifice characteristics see [for example, Japanese Utility Model Public Disclosure (Kokai) No. 61-1729 (1986)].

Another type of conventional damping force adjustable hydraulic shock absorber is arranged such that a first damping force generating valve is provided in the piston, while a second damping force generating valve, which has a relatively low fluid resistance, is provided in the intermediate portion of a bypass passage providing communication between two cylinder chambers defined in the cylinder, so that it is possible to change the level of damping force generated by the second damping force generating valve, that is, the valve characteristics, by selectively allowing working fluid to flow to the second damping force generating valve, or cutting off the flow of the working fluid by opening or closing the bypass passage by means of an externally operated shutter [see, for example, Japanese Utility Model Public Disclosure (Kokai) No. 59-11932 (1984)].

The above-described conventional damping force adjustable hydraulic shock absorbers suffer however, from the following problems.

First, in the prior art arrangement designed so that the level of damping force generated by means of orifices is variable, it is possible to obtain various characteristics of damping force generated by means of the orifices when the movement of the piston is within the low-speed region by properly selecting the orifices, but the damping force characteristics in the high piston speed region are principally determined by the characteristics of the damping force generating valve and therefore cannot be set as desired; that is, there is little room for choice. In addition, the range within which the level of the damping force can be varied is narrow. Therefore, it is impossible to obtain a level of damping force which is satisfactorily adequate for the road surface conditions when the movement of the piston is in the high-speed region.

In the prior art arrangement wherein a plurality of damping force generating valves are properly switched over, it is possible to set an optimal level of damping force in conformity with the road surface conditions, but it is necessary to provide a plurality of damping force generating valves for each of the extension and contraction strokes of the hydraulic shock absorber which increases the size and complicates the structure of the shock absorber, resulting in an increase in the weight of the product and a rise in its costs. In addition, maintenance of this arrangement is difficult.

SUMMARY OF THE INVENTION

In view of the above-described problems of the prior arts, it is a primary object of the present invention to provide a damping force adjustable hydraulic shock absorber which is designed so that it is possible to obtain a plurality of damping force characteristics with a single damping force generating valve provided for each of the extension and contraction strokes.

To this end, the present invention provides a damping force adjustable hydraulic shock absorber comprising: a piston attached to one end of a piston rod and slidably fitted in a cylinder, the piston dividing the interior of the cylinder into two cylinder chambers; a passage provided in the piston, the passage communicating with each of the two cylinder chambers, a damping force generating valve provided at the downstream side of the passage to generate a damping force; a back-pressure chamber formed at the side of the damping force generating valve which is remote from the piston to apply pressure to the valve; a bypass passage formed in the piston rod to provide communication between the back-pressure chamber and the upstream cylinder chamber that is provided at the upstream side of the passage; and a shutter externally operated to control the condition of communication between the upstream cylinder chamber and the back-pressure chamber, thereby adjusting the level of pressure inside the back-pressure chamber.

By virtue of the above-described arrangement, when the bypass passage is closed by the shutter, working fluid flows from the upstream cylinder chamber that is provided at the upstream side of the passage provided in the piston toward the downstream cylinder chamber through the passage as the piston moves, and when the level of pressure inside the flow path exceeds the rigidity of the damping force generating valve, the valve is deflected to allow the working fluid to flow out, thereby generating a damping force. At this time, no hydraulic pressure is introduced into the back-pressure chamber from the upstream side of the passage and therefore no back pressure acts on the damping force generating valve.

When the bypass passage is opened by actuating the shutter, the hydraulic pressure inside the upstream cylinder chamber is introduced into the back-pressure chamber through the bypass passage, so that the damping force generating valve is subjected to a pressure applied thereto from a direction opposite to the direction in which the pressure of the working fluid inside the flow path acts thereon. Accordingly, the damping force generating valve is not deflected unless the level of pressure inside the flow path is higher than a predetermined level and it is therefore possible to obtain a relatively high level of damping force.

Thus, it is possible to change the level of damping force to a relatively high level with a single damping force generating valve by introducing hydraulic pressure into the back-pressure chamber through the bypass passage.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denotes like elements, and of which:

FIG. 2 shows various horizontal sections of the piston and the shutter when the hydraulic shock absorber shown in FIG. 1 is set in the hard mode, in which.

FIG. 4 shows various horizontal sections of the piston rod and the shutter shown in FIG. 3, in which.

DESCRIPTION OF THE PREFERRED EMBODIMENTS

A first embodiment of the present invention will be described below with reference to FIGS. 1 to 5.

Figure 1:
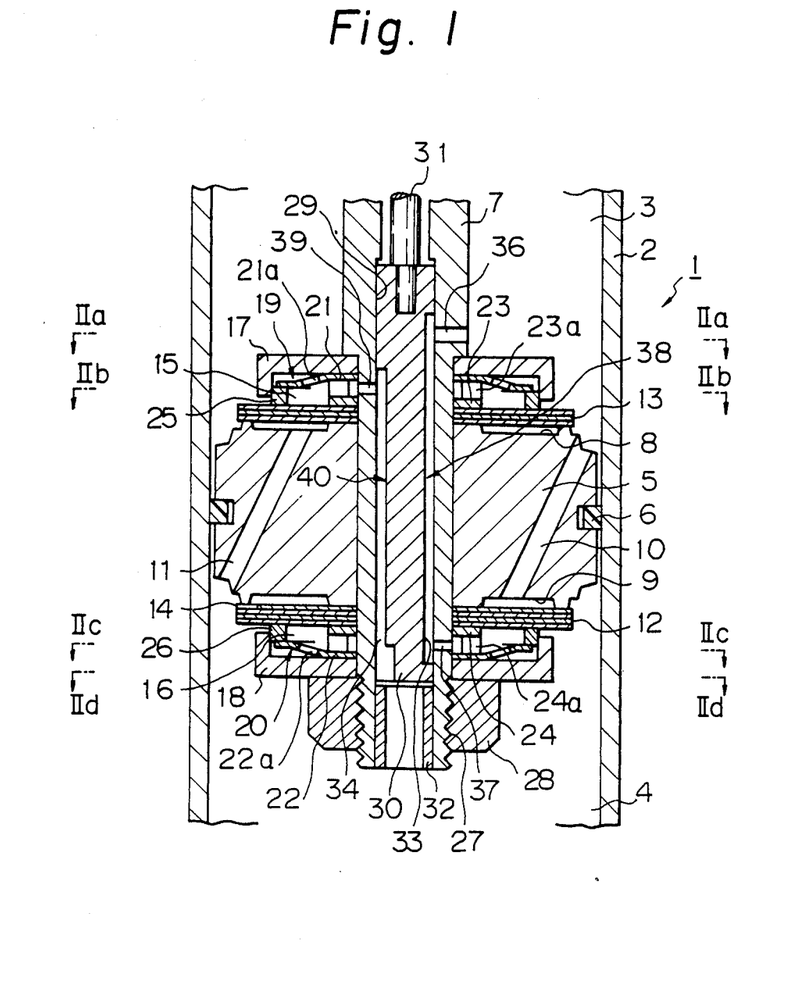
FIG. 1 is a vertical sectional view of an essential part of a damping force adjustable hydraulic shock absorber according to a first embodiment of the present invention.
Figure 2A:
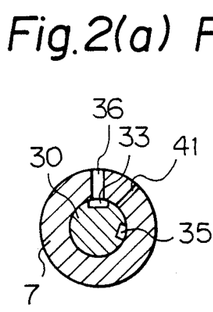
FIG. 2(a) is a sectional view taken along the line IIa—IIa of FIG. 1.
Figures 2B, 2C:
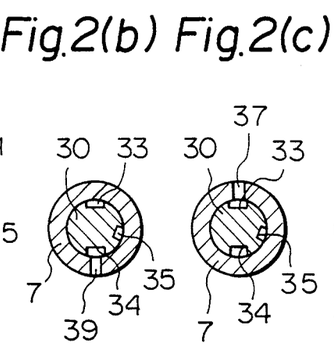
FIG. 2(b) is a sectional view taken along the line IIb—IIb of FIG. 1.
FIG. 2(c) is a sectional view taken along the line IIc—IIc of FIG. 1.
Figure 2D:
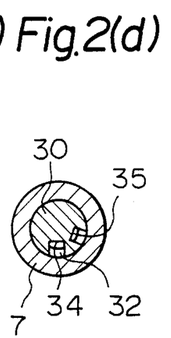
FIG. 2(d) is a sectional view taken along the line IId—IId of FIG. 1.

The arrangement of the damping force adjustable hydraulic shock absorber 1, according to this embodiment, will first be explained. Referring to FIG. 1, the reference numeral 2 denotes an inner cylinder which is coaxially provided inside an outer cylinder (not shown) of a double-cylinder structure that constitutes the hydraulic shock absorber 1. A piston 5 which divides the interior of the cylinder 2 into two cylinder chambers 3 and 4 is slidably fitted to the inner periphery of the cylinder 2 through a piston ring 6. Hereinafter, the chambers that are shown in the figure at the upper and lower sides of the piston 5 will be referred to as the "upper and lower cylinder chambers 3 and 4", respectively. It should be noted that the piston 5 is attached by means of fitting the same to the distal end portion of a piston rod 7 which will be detailed later.

The piston 5 has annular grooves 8 and 9 which are formed in the upper and lower end faces respectively. Further, the piston 5 has an extension-side passage 10 and a contraction-side passage 11, which communicate the upper and lower cylinder chambers 3 and 4 with each other. One end of the extension-side passage 10 opens outside the upper groove 8, while the other end thereof opens into the lower groove 9, whereas one end of the contraction-side passage 11 opens into the upper groove 8, while the other end thereof opens outside the lower groove 9.

An extension-side damping force generating valve 12 (disk valves) which generates a damping force during the extension stroke of the hydraulic shock absorber 1 is stacked over the lower end face of the piston 5 so as to close the groove 9. Similarly a contraction-side damping force generating valve 13 (disk valves) which generates a damping force during the contraction stroke of the hydraulic shock absorber 1, is stacked over the upper end face of the piston 5 so as to close the groove 8. These damping force generating valves 12 and 13 are arranged such that when the pressures of working fluid in the grooves 8 and 9 rise above predetermined levels ($P_A$ and $P_a$) the outer peripheries of the valves 12 and 13 are deflected to allow the working fluid to flow out, thus generating a damping force.

It should be noted that the disk valve of the extension-side damping force generating valve 12 which is closer to the piston 5 has an orifice 14 which is formed so as to communicate the upper and lower cylinder chambers 3 and 4 with each other through the extension-side passage 10.

Back-pressure chambers 15 and 16 are provided at the respective sides of the damping force generating valves 12 and 13, which are remote from the piston 5. These back-pressure chambers 15 and 16 are defined by respective casings 17 and 18, each in the form of a cylinder one end of which is closed. Seal mechanisms 19 and 20 are provided inside the back-pressure chambers 15 and 16, respectively, so that the fluid-tight conditions are maintained even when the damping force generating valves 12 and 13 are deflected.

The seal mechanism 10 (20) comprises an annular spring 21 (22), a retainer 23 (24) supporting the inner periphery of the spring 21 (22), and a cylindrical slide retainer 25 (26) slidably provided along the inner periphery of the casing 17 (18) and pressed against the damping force generating valve 12 (13) by means of the resilient force from the spring 21 (22). The annular springs 21 and 22 are provided with respective passage bores 21a and 22a, and the retainers 23 and 24 are provided with notches 23a and 24a each of which provides communication between the inner and outer sides.

It should be noted that the casings 17, 18, the seal mechanisms 19, 20, the extension- and contraction-side damping force generating valves 12, 13 and the piston 5 are secured together in one unit by screwing and tightening a nut 28 onto a threaded portion 27 formed at the distal end of the piston rod 7.

The piston rod 7 has a through-bore 20 which extends therethrough along the axis thereof. A shutter 30 is rotatably fitted in the through-bore 20 at the side thereof which is closer to the distal end of the piston rod 7. The shutter 30 is connected to one end of a control pin 31 the other end of which projects outward so that the shutter 30 can be rotated externally by actuating the control pin 31. It should be noted that the reference numeral 32 in FIG. 1 denotes a stopper for preventing the shutter 30 from falling out.

Three grooves 33, 34 and 35 which constitute bypass passages are axially formed in the outer periphery of the shutter 30. The first groove 33 defines a first bypass passage 38 which provides communication between a bore 36 communicating the upper cylinder chamber 3 with the through-bore 29 and a bore 37 communicating the through-bore 29 with the back-pressure chamber 10 provided at the extension-side damping force generating valve 12 (i.e., at the lower side as viewed in FIG. 1), thereby introducing hydraulic pressure into the lower back-pressure chamber 16 from the upper cylinder chamber 3.

The second groove 34 defines a second bypass passage 40 which provides communication between the lower cylinder chamber 4 and a bore 39 communicating the through-bore 29 with the back-pressure chamber 15 provided at the contraction-side damping force generating valve 13 (i.e., at the upper side as viewed in FIG. 1), thereby introducing hydraulic pressure into the upper back-pressure chamber 15 from the lower cylinder chamber 4.

The third groove 35 defines a third bypass passage 42 which provides communication between the lower cylinder chamber 4 and an orifice bore 41 having a relatively small diameter which communicates the upper cylinder chamber 3 with the through-bore 29.

The first and second grooves 33 and 34 are provided at two respective sides of the shutter 30 which face each other diametrically. Similarly, the bores 36, 37 and the bore 39 are provided at two respective sides of the piston rod 7 which face each other diametrically. Accordingly, the first and second bypass passages 38 and 40 are simultaneously opened or closed in response to the rotation of the shutter 30.

The operation of the above-described arrangement will next be explained.

First, when the shutter 30 is set at such a position that the first and second bypass passages 38 and 40 are closed, while the third bypass passage 42 is open (i.e., the state shown in FIGS. 3 and 4), the communication between the upper cylinder chamber 3 and the back-pressure chamber 16 and that between the lower cylinder chamber 4 and the back-pressure chamber 15 are cut off, while the upper and lower cylinder chambers 3 and 4 are communicated with each other through the third bypass passage 42.

Figure 5:
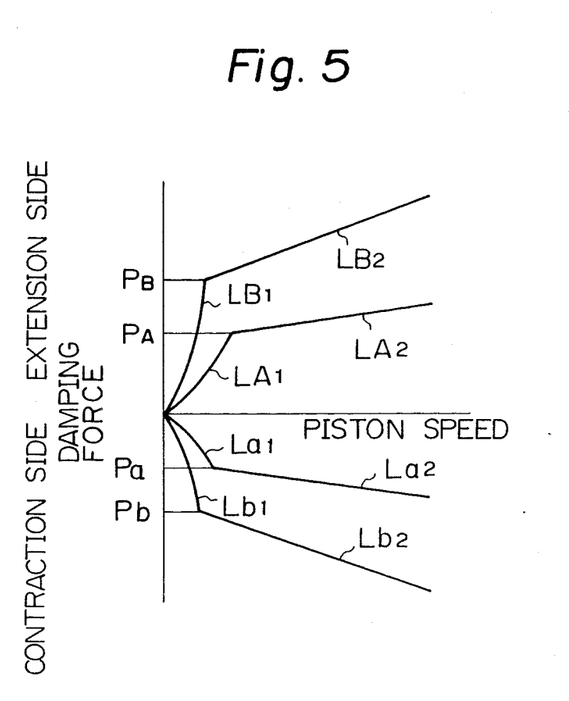
FIG. 5 is a chart showing the damping force characteristics of the hydraulic shock absorber shown in FIG. 1.

Accordingly, the damping force characteristics in the low piston speed region are determined by a combination of the orifice characteristics of the orifice bore 41 in the third bypass passage 42 and those of the orifice 14 in the extension-side damping force generating valve 12 (see the curves $L_{A1}$ and $L_{a1}$ in the damping force characteristic chart shown in FIG. 5).

In the high piston speed region, no hydraulic pressure is introduced into the back-pressure chambers 16, 15 from the upper and lower cylinder chambers 3 and 4 respectively, and relatively low damping force characteristics are obtained by means of the damping force generating valves 12 and 13 which are in a normal state wherein no back pressure acts thereon (see the curves $L_{A2}$ and $L_{a2}$ shown in FIG. 5). It should be noted that at this time the back-pressure chambers 15 and 16 are filled with working fluid, but the working fluid contained in the back-pressure chambers 15 and 16 has no effect on the damping force generating valves 12 and 13, since the amount of deflection of the damping force generating valves 12 and 13 is very small and there is also leakage of the working fluid from the back-pressure chambers 15 and 16.

The following is a description of the operation that takes place when the shutter 30 is actuated so as to open the first and second bypass passages 38 and 40 and close the third bypass passage 42.

At this time, the upper cylinder chamber 3 and the back-pressure chamber 16 are communicated with each other, and so are the lower cylinder chamber 4 and the back-pressure chamber 15. The upper and lower cylinder chambers 3 and 4 are communicated with each other only through the orifice 14 formed in the extension-side damping force generating valve 12.

The damping force characteristics at this time will be explained below.

First, when the movement of the piston 5 is in the low-speed region, damping force characteristics are determined by the orifice 14 (see the curves $L_{B1}$ and $L_{b1}$ shown in FIG. 5).

When the movement of the piston 5 is in the high-speed region, hydraulic pressure is also introduced into the back-pressure chambers 15 and 16 to press each of the damping force generating valves 12 and 18 from the side thereof which is remote from the corresponding passage provided in the piston 5. Accordingly, each of the damping force generating valves 12 and 13 is deflected with a greater pressure ($P_B$, $P_b$) than in the case where no hydraulic pressure is introduced into the back-pressure chambers 15 and 16, thus generating a damping force having valve characteristics. As the piston speed increases, the level of hydraulic pressure rises and the pressure inside the back-pressure chambers 15 and 16 also increases, resulting in an increase in the rate (slope) of rise in the level of damping force (see the curves $L_{B2}$ and $L_{b2}$ shown in FIG. 5).

In this way, when no hydraulic pressure is introduced into the back-pressure chambers 15 and 16, relatively low damping force characteristics (soft mode) are obtained, whereas, when hydraulic pressure is introduced into the back-pressure chambers 15 and 16, relatively high damping force characteristics (hard mode) are obtained. Thus, it is possible to switch over the damping force characteristics between the soft and hard modes with a single damping force generating valve provided for each of the extension and contraction strokes.

It is also possible to variously set the damping force characteristics in the hard mode by varying the diameter of the casing to thereby change the diametrical size of each back-pressure chamber and the pressure receiving area of each damping force generating valve where it receives hydraulic pressure. In this case however, the pressure receiving area of the damping force generating valves 12 and 13, where hydraulic pressure is applied through the back-pressure chambers 15 and 16, is set so as to be smaller than the pressure receiving area where hydraulic pressure is applied through the grooves 8 and 9 provided in the piston 5.

Although in this embodiment the back-pressure chambers 15 and 16 are maintained in fluid-tight condition by means of the annular springs 21, 22 and the retainers 23 and 24, it is also possible to utilize diaphragms or belloframes in place of the described arrangement.

Figure 6:
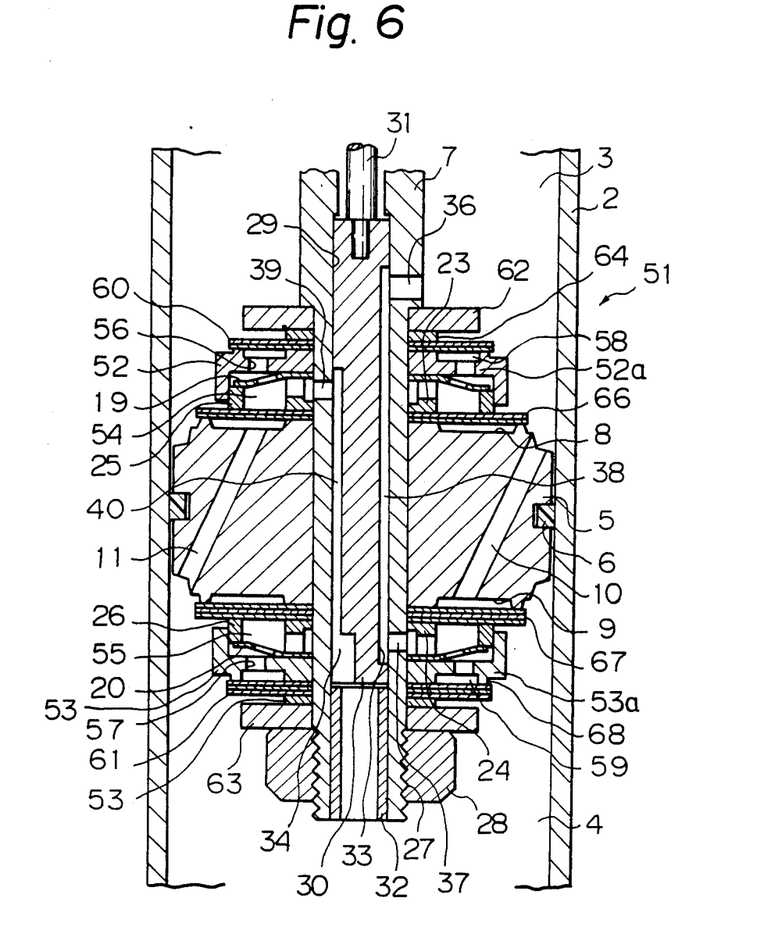
FIG. 6 is a view similar to FIG. 1, which shows a second embodiment of the present invention.

A second embodiment of the present invention will be described next with reference to FIG. 6.

Since the basic structure of the hydraulic shock absorber 51 according to this embodiment is substantially the same as that of the first embodiment, the same elements as those in the first embodiment are denoted by the same reference numerals and the description thereof is omitted.

In the hydraulic shock absorber 51 of this embodiment also, back-pressure chambers 54 and 55 for the damping force generating valves 66 and 67 are defined by respective casings 52 and 53, similar to the casings 17 and 18 in the first embodiment, that is, each of the casings 52 and 53 being in the form of a cylinder one end of which is closed. Seal mechanisms 19 and 20 are provided in the back-pressure chambers 54 and 55, respectively. However, unlike the casings 17 and 18 in the first embodiment, the casings 52 and 53 in this embodiment have through-bores 56 and 57 which are formed in the respective bottom walls 52a and 53a. Further, annular grooves 58 and 59 are formed in the respective outer surfaces of the bottom walls 52a and 53a so as to communicate with the through-bores 56 and 57, respectively. Disk valves 60 and 61 are mounted on the casings 52 and 53, so as to close the annular grooves 58 and 59, respectively. The reference numerals 62 and 63 denote washers, and 64, 65 retainers. The disk valves 60 and 61 are attached through the washers 62, 63 and the retainers 64, 65 to the piston rod 7 together with the piston 5, the damping force generating valves 66, 67, the retainers 23, 24, the seal mechanisms 19, 20 and the casings 52, 53 in one unit by means of the nut 28, as illustrated. The disk valves 60 and 61 are secured at the inner peripheral portions in the same way as in the case of the damping force generating valves 66 and 67. As will be clear from the foregoing description, the hydraulic pressures inside the back-pressure chambers 54 and 55 act on the damping force generating valves 66 and 67 and also act on the disk valves 60 and 61, respectively, so that, when the pressures are higher than a predetermined value, the disks 00 and 01 are opened to allow the back-pressure chambers 54 and 55 to communicate with the outside through the respective bores 56 and 57.

It should be noted that the damping force generating valve 67 in this embodiment is not provided with an orifice which corresponds to the orifice 14 provided in the damping force generating valve 12 in the first embodiment but the casing 53 instead is provided with an orifice 68 which provides communication between the annular groove 59 and the outside of the casing 53. Although FIG. 6 shows the hydraulic shock absorber 51 which is in a state wherein the back-pressure chamber 55 and the upper cylinder chamber 3 are communicated with each other, and so are the back-pressure chamber 54 and the lower cylinder chamber 4, through the bypass passages 38, 40 and the bores 37, 39 shown in FIGS. 1 and 2, if the shutter 30 is rotated to a predetermined position by actuating the control pin 31, the communication between the back-pressure chambers 55 and 54 on the one hand and the upper and lower cylinder chambers 3 and 4 on the other is cut off, while the upper and lower cylinder chambers 3 and 4 are communicated with each other through the third bypass passage 42 (not shown) and the small-diameter orifice bore 41 (not shown), in the same way as in the first embodiment.

The operation of the above-described arrangement will next be explained.

Figure 3:
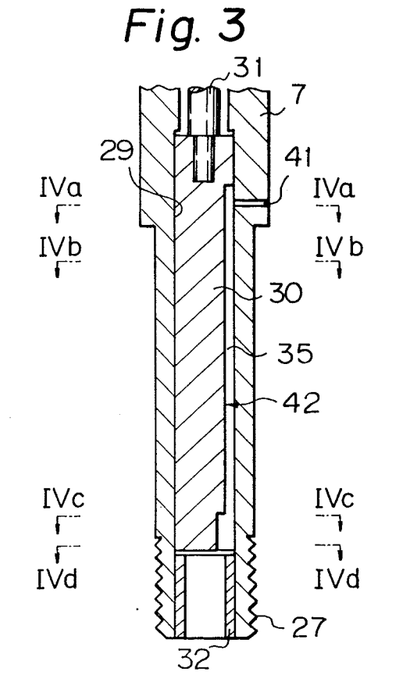
FIG. 3 is a fragmentary vertical sectional view showing the piston rod and the shutter when the hydraulic shock absorber shown in FIG. 1 is set in the soft mode.
Figures 4A, 4B:
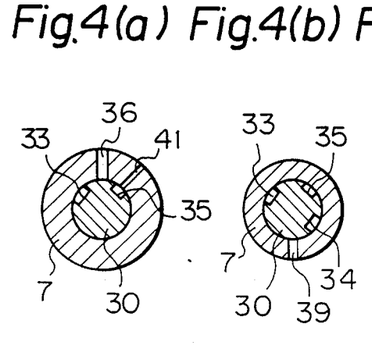
FIG. 4(a) is a sectional view taken along the line IVa—IVa of FIG. 3.
FIG. 4(b) is a sectional view taken along the line IVb—IVb of FIG. 3.
Figure 4C:
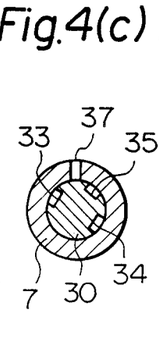
FIG. 4(c) is a sectional view taken along the line IVc—IVc of FIG. 3.
Figure 4D:
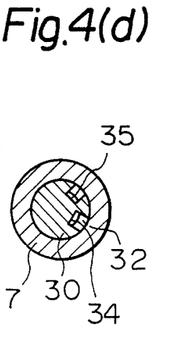
FIG. 4(d) is a sectional view taken along the line IVd—IVd of FIG. 3.

First, when the shutter 30 is set at such a position that the first and second bypass passages 38 and 40 are closed, while the third bypass passage 42 is open (i.e., in the soft mode) the hydraulic shock absorber 51 is in a state similar to the state shown in FIGS. 3 and 4. Thus, the communications between the upper cylinder chamber 3 and the back-pressure chamber 55 and that between the lower cylinder chamber 4 and the back-pressure 54 are cut off, while the upper and lower cylinder chambers 3 and 4 are communicated with each other through the third bypass passage 42.

Figure 7:
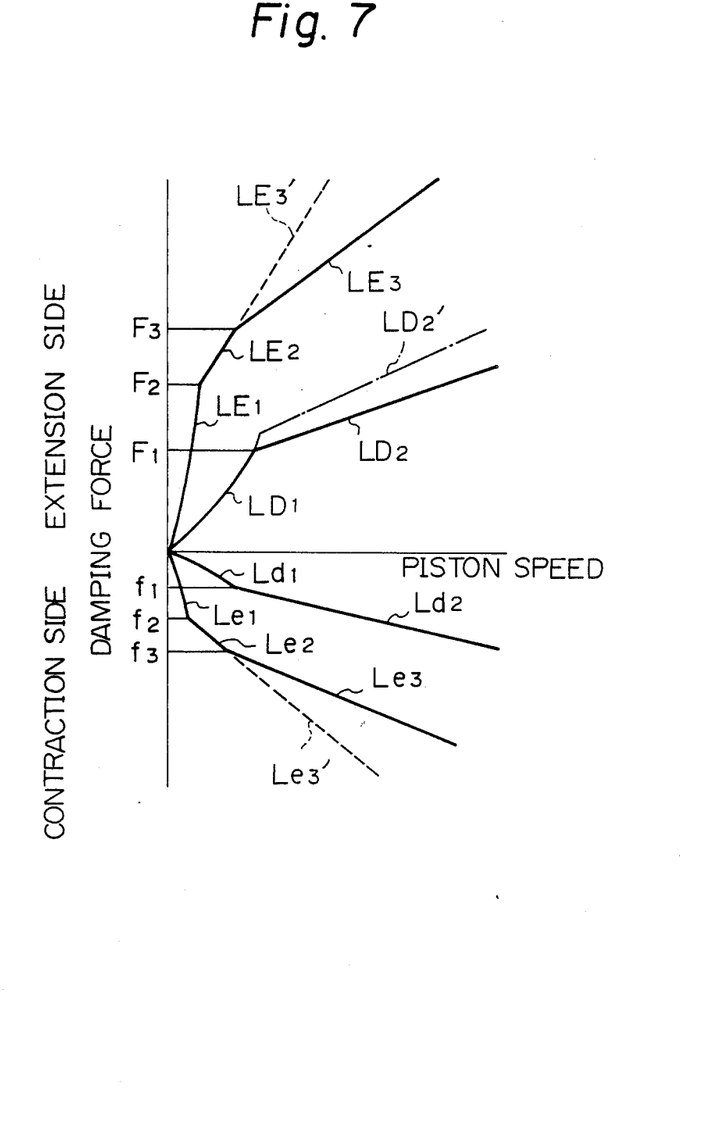
FIG. 7 is a chart showing the damping force characteristics of the hydraulic shock absorber shown in FIG. 6.

Accordingly, the damping force characteristics in the low piston speed region are determined by the orifice bore 41 in the third bypass passage 42 (see the curves $L_{D1}$ and $L_{d1}$ in the damping force characteristic chart shown in FIG. 7).

In the high piston speed region, no hydraulic pressure is introduced into the back-pressure chambers 55, 54 from the upper and lower cylinder chambers 3 and 4, respectively, and relatively low damping force characteristics are obtained by means of the damping force generating valves 66 and 67 which are in a normal state wherein no back pressure acts thereon (see the curves $L_{D2}$ and $L_{d2}$ shown in FIG. 7).

The following is a description of the operation that takes place when the shutter 30 is actuated so as to open the first and second bypass passages 38 and 40 and close the third bypass passage 42 (i.e., the operation in the hard mode).

At this time, the upper cylinder chamber 3 and the back-pressure chamber 55 are communicated with each other, and so are the lower cylinder chamber 4 and the back-pressure chamber 54. The upper and lower cylinder chambers 3 and 4 are communicated with each other only through the orifice 68 formed in the casing 53.

The damping force characteristics at this time will be explained below.

First, when the movement of the piston 5 is in the low-speed region, damping force characteristics are determined by the orifice 68 having a smaller flow path area than that of the orifice 41 (see FIGS. 3 and 4) (see the curves $L_{E1}$ and $L_{e1}$ shown in FIG. 7).

When the movement of the piston 5 is in the high-speed region, hydraulic pressure is also introduced into the back-pressure chambers 54 and 55 to press each of the damping force generating valves 66 and 67 from the side thereof which is remote from the corresponding passage provided in the piston 5. Accordingly, each of the damping force generating valves 66 and 67 is deflected with a greater pressure ($F_2$, $f_2$) than in the case where no hydraulic pressure is introduced into the back-pressure chambers 54 and 55, thus generating a damping force having valve characteristics. As the piston speed increases, the level of hydraulic pressure rises and the pressure inside the back-pressure chambers 54 and 55 also increases, resulting in an increase in the rate (slope) of rise in the level of damping force (see the curves $L_{E2}$ and $L_{e2}$ shown in FIG. 7).

As the piston speed further increases, the disk valves 61 and 60 are opened with higher pressures $F_3$ and $f_3$ than the pressures $F_2$ and $f_2$, thus exhibiting damping force characteristics shown by the curves $L_{E3}$ and $L_{e3}$ in FIG. 7.

As has been described above, in the hydraulic shock absorber of this embodiment, the damping force characteristics in the region where the pressures are $F_3$ and $f_3$ or higher are not those represented by the line segments $L_{E3}$, and $L_{e3}$, shown in FIG. 7, but those represented by the line segments $L_{E3}$ and $L_{e3}$, so that it is possible to effect an adjustment of the damping force which is preferable to the case of the first embodiment.

It should be noted that, although in the above-described second embodiment the communication between the back-pressure chambers 54, 55 on the one hand and the cylinder chambers 4, 3 on the other is cut off in the soft mode, the arrangement may also be as follows. Namely, in still another embodiment of the present invention, a throttle bore (not shown) which communicates with the back-pressure chamber 55 is provided in the piston rod 7 in addition to the bore 37 which is employed in the hard mode, and the flow path area of this throttle bore is set so as to be substantially equal to or slightly greater than that of the orifice 68, so that in the soft mode the first bypass passage 38 and the throttle bore are aligned to communicate with each other, thereby providing communication between the back-pressure chamber 55 and the cylinder chamber 3 through the throttle bore. When the soft mode is selected in the above-described arrangement, during the extension stroke the pressure $P_1$ inside the cylinder chamber 3 is introduced into the back-pressure chamber 55 after being reduced through the throttle bore, so that the pressure $P_2$ inside the back-pressure chamber 55 is lower than the pressure $P_1$ (however, the pressure $P_2$ is higher than the pressure $P_3$ inside the cylinder chamber 4 by the throttling action of the orifice 68). Accordingly, the pressure $P_2$ inside the back-pressure chamber 55 that acts on the damping force generating valve 67 in the soft mode is lower than the pressure $P'_2 (\approx P_1)$ inside the back-pressure chamber 55 in the hard mode and it is therefore possible to obtain damping force characteristics having valve characteristics such as those shown by the one-dot chain line $L_{D2'}$ in FIG. 7.

Although the foregoing description has been made with regard to the extension stroke, a similar arrangement may also be employed for the contraction stroke. In such a case, the arrangement may be such that a throttle bore (not shown) is provided in the piston rod 7 in addition to the bore 39 and an orifice which is similar to the orifice 68 in the casing 53 is provided in the casing 52.

Although in any of the foregoing embodiments the third bypass passage 42 and the small-diameter orifice bore 41 are provided in order that the level of damping force determined by the orifice characteristics should be lower in the soft mode than in the hard mode, the third bypass passage 42 and the orifice 41 may be omitted in the case where the orifice characteristics may be common to the hard and soft modes.

As has been detailed above, the damping force adjustable hydraulic shock absorber according to the present invention is arranged such that a back-pressure chamber is provided for each damping force generating valve provided on a piston at the side of the valve which is remote from the piston and the back-pressure chamber and the corresponding cylinder chamber are communicated with each other through a bypass passage which is selectively opened and closed by means of a shutter, thereby enabling hydraulic pressure inside the cylinder chamber to be introduced into the back-pressure chamber. Thus, when the bypass passage is closed by actuating the shutter, no hydraulic pressure is introduced into the back-pressure chamber, so that a relatively low level of damping force is obtained, whereas, when the bypass passage is opened, hydraulic pressure is introduced into the back-pressure chamber, a relatively high level of damping force thus being obtained.

Since it is possible to change the valve characteristics with a single damping force generating valve provided for each of the extension and contraction strokes, it is possible to lower the production cost of the hydraulic shock absorber and reduce the size of the product. In addition, simplification of the structure improves its maintainability.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A damping force adjustable hydraulic shock absorber comprising:
   a piston attached to one end of a piston rod and slidably fitted in a cylinder, said piston dividing the interior of said cylinder into two cylinder chambers;
   a passage provided in said piston, said passage communicating with each of said two cylinder chambers;
   a damping force generating valve provided at the downstream side of said passage to generate a damping force;
   a back-pressure chamber formed at the side of said damping force generating valve which is remote from said piston to apply pressure to said valve;
   a bypass passage formed in said piston rod to provide communication between said back-pressure chamber and the upstream cylinder chamber that is provided at the upstream side of said passage; and
   a shutter externally operated to control the condition of communication between said upstream cylinder chamber and said back-pressure chamber, thereby adjusting the level of pressure inside said back-pressure chamber.

2. A damping force adjustable hydraulic shock absorber according to claim 1, further comprising:
   a second passage providing communication between said back-pressure chamber and the cylinder chamber in which said back-pressure chamber is disposed; and
   valve means for closing said second passage in a normal state and opening said second passage when the pressure inside said back-pressure chamber reaches a predetermined value.

3. A damping force adjustable hydraulic shock absorber according to claim 2, wherein said shutter provides communication between said upstream cylinder chamber and said back-pressure chamber through said bypass passage at one position and cuts off such communication at another position.

4. A damping force adjustable hydraulic shock absorber according to claim 3, further comprising a second bypass passage which provides communication between said two cylinder chambers through an orifice bore when said shutter cuts off the communication through said bypass passage.

5. A damping force adjustable hydraulic shock absorber according to claim 1, wherein said shutter provides communication between said upstream cylinder chamber and said back-pressure chamber through said bypass passage at one position and cuts off such communication at another position.

6. A damping force adjustable hydraulic shock absorber according to claim 5, further comprising a second bypass passage providing communication between said two cylinder chambers through an orifice bore when said shutter cuts off the communication through said bypass passage.

* * * * *